Oct. 9, 1956
F. J. McCARTHY
2,766,402
GASEOUS ELECTRIC DISCHARGE CONTROL
DEVICE FOR WAVEGUIDE SYSTEMS
Filed Dec. 19, 1950
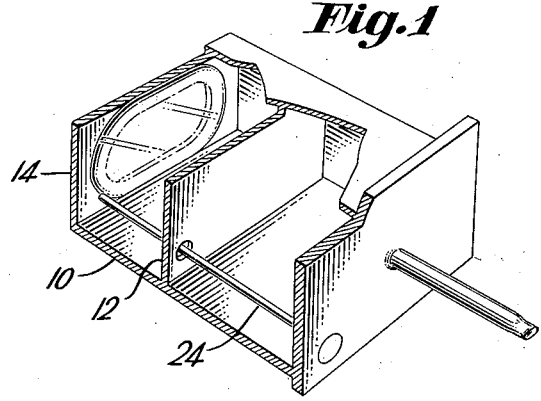
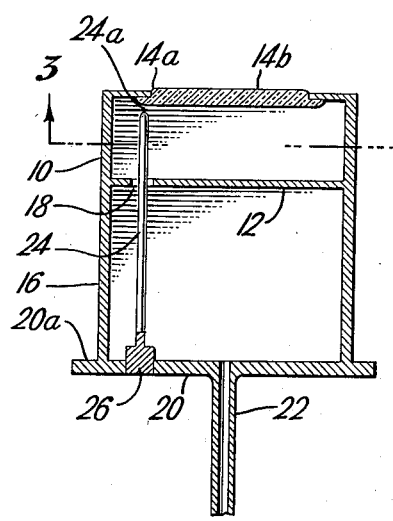
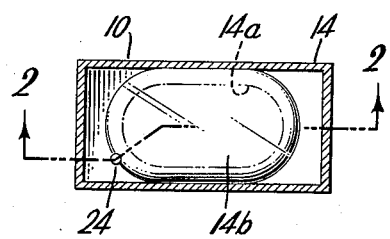
INVENTOR
FRANCIS J. McCARTHY
BY
Paul S. Martin
ATTORNEY

United States Patent Office 2,766,402
Patented Oct. 9, 1956

2,766,402

GASEOUS ELECTRIC DISCHARGE CONTROL DEVICE FOR WAVEGUIDE SYSTEMS

Francis J. McCarthy, Boston, Mass., assignor to Sylvania Electric Products Inc., a corporation of Massachusetts Application December 19, 1950, Serial No. 201,604

4 Claims. (Cl. 315—39)

The present invention relates to wave-guide apparatus and in particular, to sections of wave-guide containing ionizable gas for control and switching of propagation in wave-guide systems.

It is desirable in wave-guide systems that means be provided for changing the propagation paths. In a radar system the path from the antenna is switched either to a transmitter that operates at high power level or to a receiver that operates at low level. The sensitive receiver would be damaged by power bursts were it directly coupled to the transmitter. Between transmitter bursts, the antenna energy should be conserved for the receiver. Various types of control electric discharge devices are known having a chamber containing ionizable gas, including TR (Transmit-Receive) and ATR (Anti-Transmit Receive) tubes. When these are used in the same wave-guide system containing the transmitter, the receiver, and the antenna, a burst of transmitter power causes ionization in the tube. The consequent change in the impedance which the gas tubes present to the connected wave-guide system converts the wave-guide system from one that isolates the transmitter from the antenna to one that effectively couples the transmitter to the anenna, while reversely affecting the receiver-antenna coupling.

The present invention is concerned with tubes including gas-filled sections of wave-guide, such as are used in wave-guide systems and has as an object an improvement of the means for initiating the ionized discharge in such a device. The present invention provides a new type of probe in a discharge-initiating gap in such device, with resulting improved sensitivity. Ionization can thereby be initiated at lower power levels than have been effective for "firing" such devices heretofore.

The following illustrative disclosure is concerned with a so called ATR tube which is used to limit the absorption in a radar transmitter of signal energy from an antenna, the ATR tube serving to reflect the energy from the transmitter path and conserve it for the receiver in the same wave-guide system. It will be apparent that the invention has application in other related wave-guide devices. In this illustrative device, a discharge path having a narrow gap is formed by a probe of dielectric or insulating material that extends through the volume of the ATR tube, close to but spaced from a point of high field concentration. In particular, this dielectric probe extends from the short-circuiting rear wall of the ATR tube to a point immediately adjacent to the edge of the resonant window opposite to the rear wall and through which the energy is admitted. The power minimum at which an ATR tube fires can be reduced to ⅛ the former level by introducing such probe. The immediate effect of this is that the new ATR tube can be used in a transmit-receive wave-guide system which uses a much lower-power transmitter than previously could be used with ATR tubes. The probe does not disturb the performance of the tube in unfired state.

The following detailed disclosure of an illustrative embodiment of the invention will enable those skilled in the art to apply the invention, but although the principle of its operation is not fully understood, nevertheless a range of varied application and rearrangement will be apparent.

In the accompanying drawings,

Figure 1 is a perspective view of an illustrative ATR tube embodying the invention, parts thereof being broken away to reveal the interior.

Figure 2 is a longitudinal cross-section of the device of Figure 1 along the line 2—2 in Figure 3, and Figure 3 is a transverse cross-section of the device along the line 3—3 in Figure 2.

The device shown includes a quarter-wave section 10 of rectangular wave-guide having its rear bounded by short-circuiting wall 12. Opposite wall 12 is a window 14 having a metal rectangular-edged frame with a resonant opening 14a that is covered by a glass center portion 14b. The term glass is here used in its broad sense. The space within wave-guide section 10 is normally filled with gas at a low pressure, argon at about 15 mm. being commonly used for this purpose. Behind wall 12 of wave-guide section 10 is a wave-guide extension 16, this space or chamber serving as a reservoir also containing the gas mixture. Reservoir 16 communicates through hole 18 in wall 12 to wave-guide section 10 for extending the useful life of the gas fill that tends to deteriorate. Hole 18 is made so small as not to affect the short-circuiting properties of wall 12. The rear end of section 16 is closed by a wall 20 affording a mounting flange 20a and having an exhaust tubulation 22 through which the device is evacuated and then filled with the proper ionizable mixture.

The device described to this point represents a conventional ATR tube that is employed in transmit-receive wave-guide systems. In one illustrative system a relatively sensitive ATR tube fired at a power level of 4.0 kilowatts, but was not reliable at this level. By adding the dielectric probe described below, the ionizing level was reduced to substantially below 1.0 kilowatt. The effect of this is to extend the advantages of ATR tubes to wave-guide systems using lower transmitter powers than has been feasible heretofore. The dielectric probe does not disturb the electrical performance of the tube between periods of ionization.

A glass rod 24 extends through the volume of the ATR tube section 10 from its rear to a point adjacent to but spaced from the glass 14b at the edge of resonant opening 14a. For mechanical reasons, this glass rod extends through the reservoir opening 18, and is fused to a supporting plug 26 of metal that is hermetically joined to end wall 20. By this arrangement it is possible during manufacture to adjust the gap 24a between probe 24 and the glass 14b. As a scale of values, the diameter of probe 24 is 1/16 inch in one operative example.

In operation, when a $TE_{01}$ field is impressed on window 14, the ionizing discharge commences at a relatively low power level at gap 24a and spreads into the volume of the device. The window has a high field concentration at the resonant opening, the field pattern spreading and becoming less concentrated in the volume of wave-guide section 10. At the time of a transmitter burst, when the ionization should instantly occur, there is believed to be a displacement electron current induced in rod 24, which is effective at gap 24a (where the field is highly concentrated) to initiate the ionization. This theory has not been verified and I do not wish to be limited by it. Nevertheless, the value of probe 24 has been demonstrated by its effect. Furthermore, the introduction of the dielectric probe has been found not to modify the characteristics of the wave-guide section 10 appreciably during low level periods when the gas is not ionized.

The invention has been described in connection with the presently preferred embodiment, but its broad aspects will be understood by those skilled in the art to have varied application, and the specific embodiment described will be recognized as having effective application in various modified forms. Therefore, the appended claims should be accorded the latitude of interpretation consistent with the spirit and scope of the invention.

I claim:

1. An ATR tube including a length of rectangular wave guide having a shorted rear end and a resonant window at the opposite end, the resonant window having a glass center portion, and a dielectric probe extending from the rear end to a point near the edge of the resonant window, the end of said probe and the adjacent region of said window forming a discharge initiating gap within the tube.

2. An ATR tube including a length of rectangular wave guide, a window at one end of said wave guide having a resonant aperture, short-circuiting wall spaced from said window and parallel thereto, and an additional wall remote from said window, the space between said remote wall and said short-circuiting wall being filled with an ionizable gas at low pressure and thus constituting a gas reservoir, and the space between said window and said short-circuiting wall being similarly filled with the gas, said short-circuiting wall having an aperture for equalizing the gas pressure and composition between the two spaces, said aperture being so small as not to appreciably affect the short-circuiting properties of the dividing wall, and a probe of dielectric material secured at one end to said remote wall and extending through said aperture with its other end closely adjacent the edge of the window aperture and forming therewith a discharge initiating gap within the tube.

3. An ATR tube including a length of wave guide having at one end a window including a transverse wall provided with a resonant opening and a glass center through that opening and at the opposite end of the rectangular wave guide a rear metal closure, said length of wave guide having a short-circuiting wall parallel to said window between the window and the rear metal closure, an ionizable gas in said wave guide at both sides of said short-circuiting wall, said wall having an aperture for equalizing the gas pressure and composition in the two sections of wave guide at opposite sides of the short-circuiting wall, and a probe of dielectric material extending from a support at the rear metal closure through the aperture to a point closely spaced from the edge of said window, and forming therewith a discharge initiating gap within the tube.

4. A wave guide device including a length of wave guide having a window closing one end, said window including a metal frame formed with an opening and the opening covered by a sealed glass center, and a wall closing the opposite end, an ionizable gas within said wave guide, and a dielectric probe extending from a support on said wall toward said window and having one end closely adjacent said window and forming therewith a discharge initiating gap within the tube.

References Cited in the file of this patent

UNITED STATES PATENTS

| | | |
|---|---|---|
| 2,157,952 | Dallenbach | May 9, 1939 |
| 2,416,168 | Fiske | Feb. 18, 1947 |
| 2,444,303 | McCarthy | June 29, 1948 |
| 2,451,825 | Guarrera | Oct. 19, 1948 |
| 2,531,122 | Fiske | Nov. 21, 1950 |
| 2,533,512 | Samuel | Dec. 12, 1950 |
| 2,589,739 | Shepherd | Mar. 18, 1952 |